United States Patent Office 3,184,120
Patented May 18, 1965

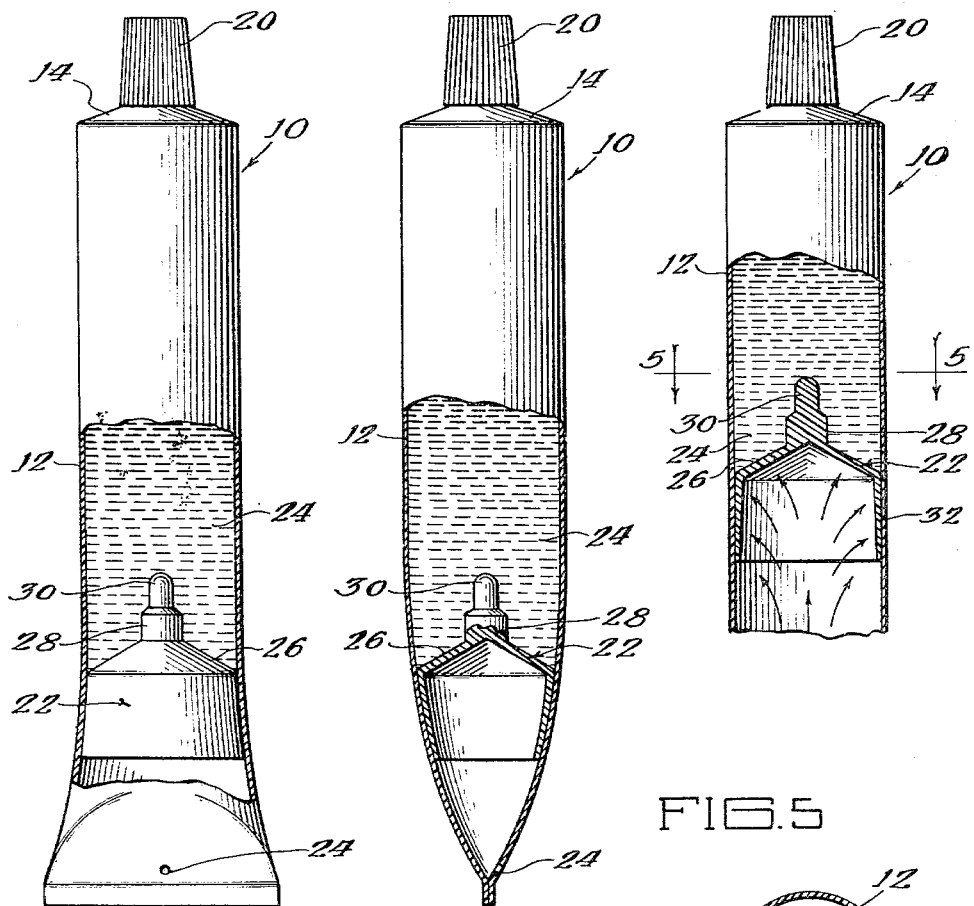

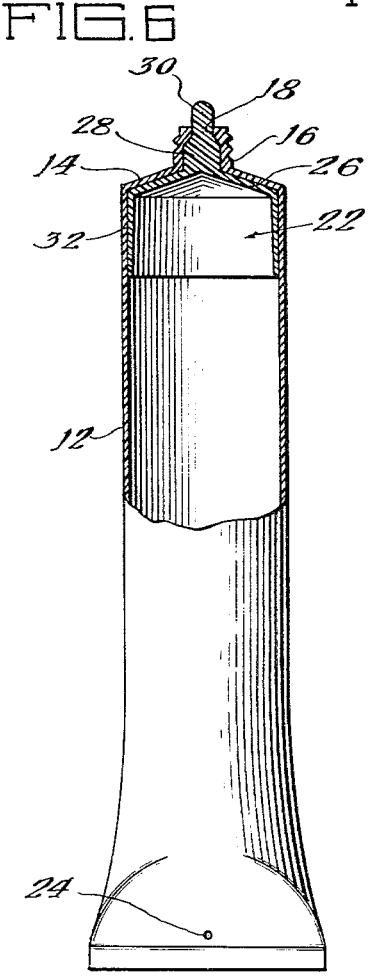
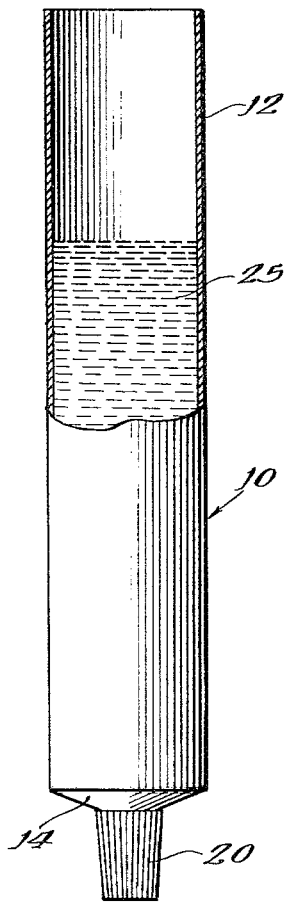
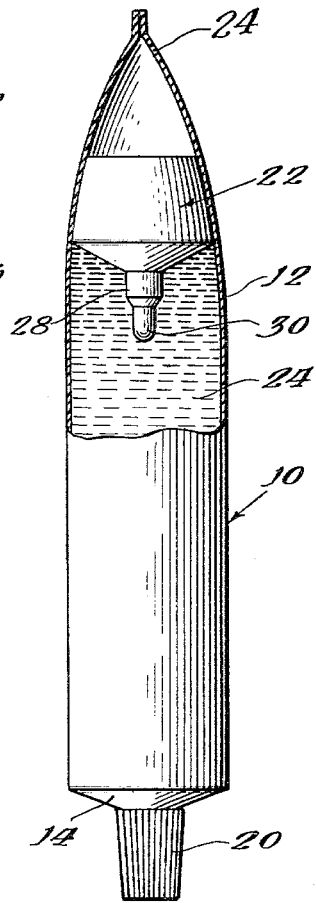
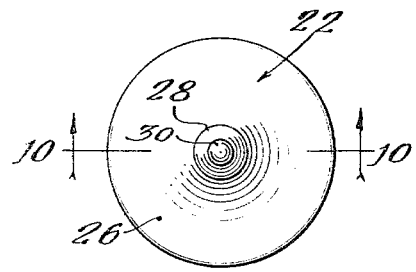
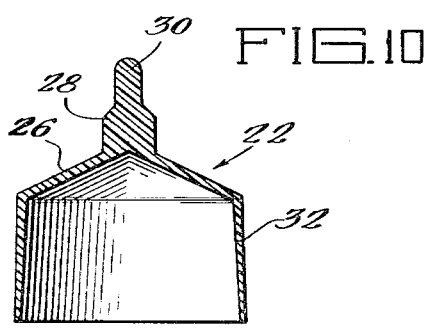

3,184,120
DISPENSING DEVICE FOR FLUIDS
Karl Undi, Hammond, Ind., assignor of one-half to
Katherine Undi, Hammond, Ind.
Filed Aug. 16, 1963, Ser. No. 302,553
2 Claims. (Cl. 222—209)

This invention relates to devices for dispensing fluids and more particularly to such a device including a deformable tubular container and means therein for completely emptying it of its contents.

In the case of liquid and cream shampoos, toothpaste, lotions, and other substances dispensed from compressible or deformable tubes, it is a matter of some difficulty, if not impossible, to completely empty the contents of the tube. The problem is sometimes augmented by the fact that certain fluids have an affinity for, and tend to cling to, the interior wall of the tube.

A substantial portion of the contents are frequently left in the tube because of an inability to remove the contents by squeezing the tube in the normal fashion. The contents cling to the wall of the tube and an appreciable amount is also lost in the normally incompressible top portion of the tube and in the neck.

The problem becomes more critical where a relatively valuable commodity comprises the contents of the tube such as, any one of the increasing number of fluid medicinal preparations sold in tubes.

The present invention is designed to remove substantially all of the contents from deformable tubular containers.

The primary object of this invention is to provide a new and improved device for dispensing fluid substances of varying viscosities.

Another object of the present invention is to prevent the wasting of the contents of deformable tubular containers.

Another object of this invention is to provide a simple and inexpensive means for completely emptying the contents of a collapsible dimensionally-stable tube.

It is a further object of this invention to provide a new and improved device for dispensing fluids of varying viscosities including a deformable dimensionally-stable tube and means therein for completely emptying said tube.

In accordance with my invention, I provide deformable dimensionally-stable tube having an outlet at its top end for the fluid to be dispensed; the outlet of the tube is capped and the tube is inverted and partially filled with the substance to be dispensed therefrom; a plunger is then inserted into the tube; and the open end of the tube is then closed by heat sealing and punctured to provide a small air inlet in the bottom end of the tube.

Further objects, features and advantages of the present invention will become apparent from the following description of the preferred embodiment illustrated in the accompanying drawings, in which:

FIGURE 1 is a front elevational view of a dispensing device in accordance with this invention, a portion of the wall of the tube being broken away;

FIGURE 2 is a top view of the tube of FIGURE 1;

FIGURE 3 is a side elevational view of a dispensing device in accordance with this invention having a portion of the wall of the tube and plunger broken away;

FIGURE 4 is a fragmentary side elevational view of a dispensing device comprising this invention with a portion of the wall of the tube broken away and showing the action of the air pressure on the plunger;

FIGURE 5 is a sectional view taken along line 5—5 of FIGURE 4;

FIGURE 6 is a front elevational view with a portion of the wall of the tube broken away showing the plunger in its uppermost position;

FIGURE 7 is an elevational view of an open-ended inverted tube with a portion of its wall broken away;

FIGURE 8 is a side elevational view of the dispensing tube of this invention in inverted position with a portion of its wall broken away to show the plunger and the contents to be dispensed from the tube;

FIGURE 9 is an enlarged top view of the plunger; and

FIGURE 10 is a sectional view taken along line 10—10 of FIGURE 9.

Referring now more particularly to the drawings, in FIGURE 1 there is shown a tube, generally indicated at 10, having a wall 12 of deformable, dimensionally-stable material, preferably polyethylene plastic. The tube has an annular top shoulder 14 and a neck 16 having an outlet 18 for dispensing the contents 25 of the tube. A cap 20 is threaded onto the neck 16 for closing the outlet 18. A plunger, generally shown at 22, is positioned within the tube 10 beneath the contents to be dispensed from the tube. The lower end of the tube is provided with a small opening 24 providing an air passage for admitting air pressure into the interior of the tube 10 beneath the plunger 22. The size of opening 24 is such that the expulsion of air therethrough will not substantially effect the buildup of air pressure within the tube beneath the plunger when the tube is compressed in the normal fashion. For most efficient operation, the diameter of the opening 24 may vary with the size of the tube; however, the hole will preferably be .010 inch to .025 inch in diameter.

The plunger 22 has a tapered annular top portion 26 having an upwardly projecting stud 28 terminating in an indicator tip 30. The plunger has a resiliently flexible, depending skirt 32. As best seen in FIGURE 10, the skirt is flared outwardly toward its lower end. In the embodiment shown, the annular top portion 26 of plunger 22 has approximately the same diameter as the inside of the tube, while the lower end of skirt 32 has a normal diameter about .005 inch greater than the inside diameter of the tube.

The plunger is made of resiliently flexible material such as polyethylene and has a wall thickness of about .018 inch to .022 inch. All of the figures recited herein are given by way of example only, and it is understood that other dimensions may be used without departing from the spirit of the invention.

Both the top annular portion of the plunger 22 and the depending skirt make a close, sealing, slidable fit within the tube so that none of the substance 24 to be dispensed from the tube can leak by the plunger into that portion of the tube beneath the plunger.

The opening 24 providing an air passage is of such a small size that when the tube is squeezed below the plunger in the normal fashion, the air pressure within the tube beneath the plunger is increased sufficiently to expand the skirt 32 tightly against the wall of the tube and to advance the plunger upwardly pushing the contents of the tube out the outlet 18. In this manner, the skirt 32 of plunger 22 wipes the wall 12 of the tube 10 substantially clean of substance 25 as it is moved upwardly in the tube.

When the manual compressive force on the tube is released, air passes in through opening 24 to expand the tube to its normal position and establish normal atmospheric pressure behind the plunger 22. With normal atmospheric pressure behind the plunger and its normal engagement with the dimensionally-stable wall of the tube, the plunger is retained in its advanced position in the tube.

Plunger 22 is adapted to empty all of the contents from the tube. The annular top portion 26 of the plunger is adapted to mate with the annular top shoulder 14 of the tube and stud 28 has the same size and shape as the inside of neck 16 so as to remove the last contents of the tube when plunger 22 is in its uppermost position as shown in FIGURE 6.

The stud 28 functions as a stabilizer during movement of the plunger 22 upwardly in the tube 10 by preventing the plunger from tipping over in the tube. The stud also enables the plunger to be cammed into the neck of the tube even if the stud and neck opening are not properly aligned.

The indicator tip 30 carried by stud 28 is adapted to protrude through outlet 18 in neck 16 to indicate that the contents of the tube are completely emptied. The indicator tip 30 may be colored to make it readily noticeable as it protrudes through the outlet 18.

The dispensing device comprising this invention is assembled by positioning a capped tube so that its bottom open end is upwardly exposed as seen in FIGURE 7. The desired liquid is then introduced into the tube through its open end and a plunger is inserted through the open end and against the exposed surface of the liquid. The open end is then closed by pinching the wall of the tube together and heat sealing it. The tube is punctured to form a small air inlet aperture between the plunger and the sealed bottom end of the tube.

Since the plunger 22 affords inner support for the tube 10 and prevents it from tapering down as fast as a conventional tube without an internal support, the tube 10 has an enlarged content volume with the plunger in the tube.

Although a preferred embodiment of the invention is herein disclosed for purposes of explanation, various modifications thereof, after study of this specification, will be apparent to those skilled in the art to which the invention pertains. Reference should accordingly be had to the appended claims in determining the scope of the invention.

I claim:

1. A device for dispensing fluids, comprising: a tube having a hollow body of deformable, dimensionally-stable material, the tube having an outlet at its top end for the fluid dispensed and being closed at its lower end, said lower end being provided with an inlet for admitting air into the tube; and a plunger positioned within the tube beneath the fluid to be dispensed, said plunger having an annular top portion in close slidable sealing engagement with the inner wall of the tube and being provided with a resiliently flexible, flared, depending annular skirt having a peripheral dimension slightly larger than the inner peripheral dimension of the hollow body of the tube, said skirt being normally resiliently urged against the inner surface of the hollow body so as to make a close sealing slidable fit within said hollow body of the tube, compression of the lower end of the tube beneath the plunger compressing the air confined within said tube so as to further urge the depending flexible skirt against the inner surface of the hollow body and to maintain intimate sealing engagement therewith while advancing the plunger upwardly of the tube and dispensing the fluid in the tube through said outlet.

2. The dispensing device of claim 1 wherein said annular top portion is substantially rigid and the peripheral marginal edge of said top portion is generally co-extensive with the inner surface of the hollow body of the tube, said annular skirt being positioned to depend from said peripheral marginal edge.

References Cited by the Examiner
UNITED STATES PATENTS

| | | | |
|---|---|---|---|
| 2,284,218 | 5/42 | Livingston | 222—49 |
| 2,329,917 | 9/43 | Lautmann | 222—389 X |
| 2,605,018 | 7/52 | Croce et al. | 222—107 |
| 2,777,612 | 1/57 | Bensen | 222—209 |
| 2,880,913 | 4/59 | Peyron | 222—389 X |
| 2,898,007 | 8/59 | Gassaway | 222—212 |
| 3,066,836 | 12/62 | Trumbull | 222—389 X |

LOUIS J. DEMBO, *Primary Examiner.*